Feb. 19, 1963   G. CANDELLERO   3,077,794
EPICYCLIC CHANGE-SPEED GEARING
Filed June 2, 1961   2 Sheets-Sheet 1

3,077,794
EPICYCLIC CHANGE-SPEED GEARING
Giovanni Candellero, Turin, Italy, assignor to Fiat Societa per Azioni, Turin, Italy
Filed June 2, 1961, Ser. No. 114,365
Claims priority, application Italy June 11, 1960
3 Claims. (Cl. 74—763)

This invention relates to a change speed box of the type comprising epicyclic reduction gears, adapted to be interposed in the transmission connecting the engine to motor vehicle wheels.

A primary object of this invention is to provide a change speed gear box of smaller overall size, especially in an axial direction with respect to conventional change speed gear boxes not having epicyclic reducing gears.

The reduction in size is particularly advantageous in installing the improved change speed gear box on motor vehicles having their engine adjacent the driving wheels, inasmuch as the overall size of the motor propelling unit on the vehicle can be reduced and available space can conveniently be utilized to provide baggage compartments and the like.

A further object of this invention is to provide a change speed gear box in which change in speed takes place without any interruption in power, in such manner that the change speed operation is considerably simplified, in that the driver need not act on the friction clutch, as distinct from conventional change speed gear boxes.

A further object of this invention is to provide a change speed gear box, in which steadiness of power transmission on change of speed is obtained in a simple manner without requiring special adjusting or synchronizing measures.

The improved change speed gear box is substantially characterized by the fact that it comprises at least one epicyclic gearing assembly having two sun wheels differing in diameter adapted to be selectively coupled with the inlet shaft of the change speed gear box for selecting forward speeds or reverse, a first set of planet gears carried by a carrier coaxial with the inlet and outlet shafts of the change speed gear box and meshing with one of the said sun wheels, a second set of planet gears meshing with the other sun wheel, the first mentioned planet gear set and a toothed rim acting as an outer gear for the epicyclic gearing and being connected with the outlet shaft of the change speed gear box or the outer gear of a further reducing epicyclic gearing, means including friction members hydraulically operated to separately or simultaneously brake the planet wheel carrier and/or either sun wheel of the epicyclic gearing assembly or assemblies in order to throw in the various transmission ratios afforded by the change speed gear box.

The change speed gear box according to this invention conveniently includes resilient means adapted to act on one at least of the said friction members for keeping direct gear clutched in.

A further characteristic feature of the improved change speed gear box resides in the fact that the inlet shaft of the change speed gear box receives motion from the engine shaft through a centrifugal coupling comprising clutch means adapted to maintain the driven and driving coupling members coupled together during the periods when the engine is rotated by the transmission.

For the reasons explained above the improved change speed gear box dispenses from a conventional friction clutch, the action of which is replaced on starting by the action of the centrifugal coupling, and during change of speed by the action of the hydraulically operated friction members incorporated by the change speed gear box.

It should be understood that the description is given by way of a non limiting example, referring to the accompanying drawings wherein.

Figure 1:
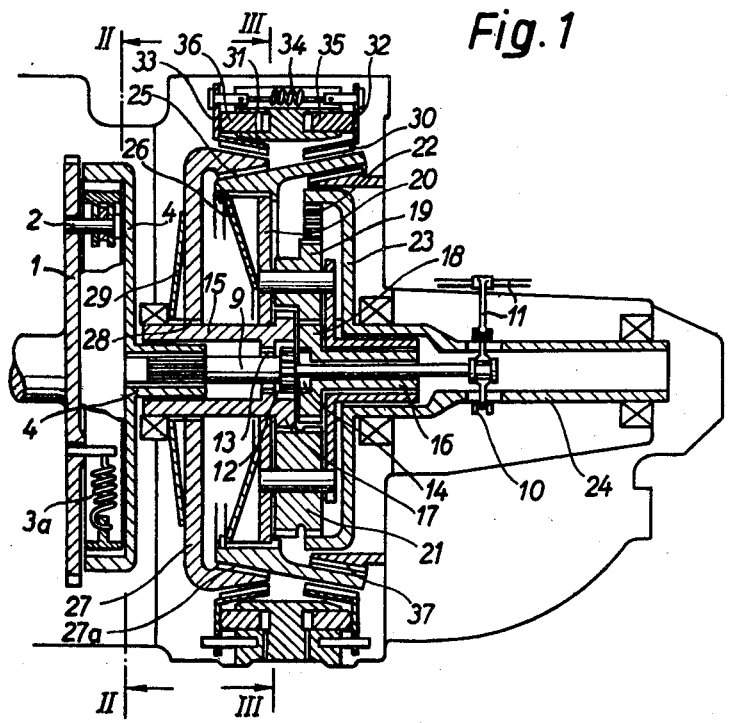
FIG. 1 is a diagrammatical axial sectional view showing a three-speed gear box with its centrifugal clutch connected with the engine shaft.
Figure 3:
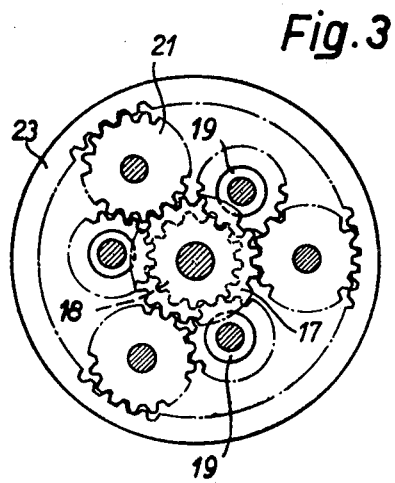
FIG. 3 is a cross sectional view of the epicyclic gearing on line III—III of FIG. 1.
Figure 2:
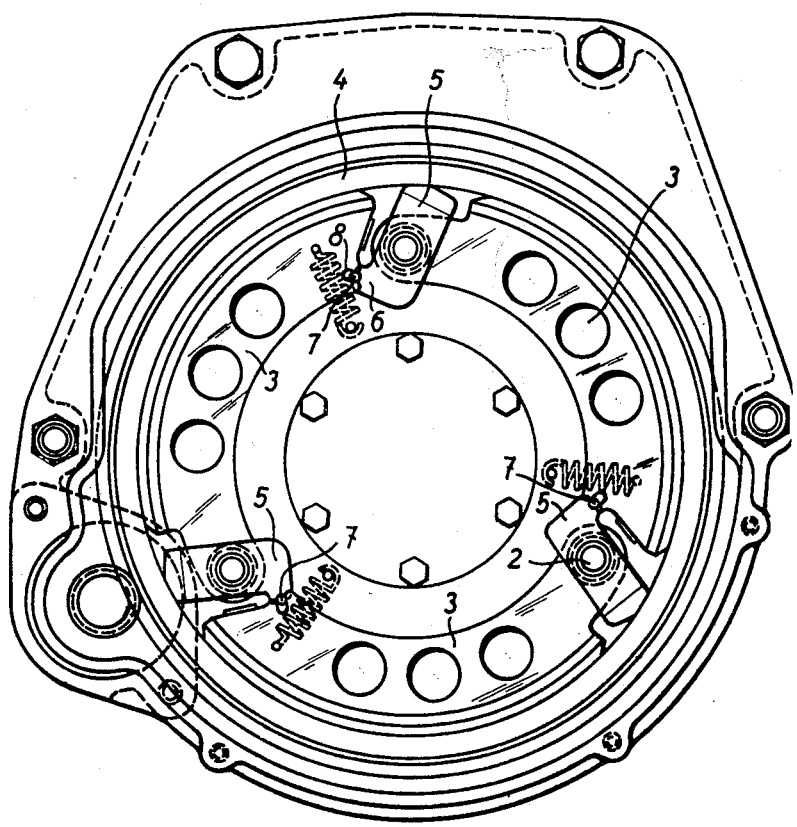
FIG. 2 is a cross sectional view of the clutch on line II—II of FIG. 1.

In the drawings, FIGURES 1 to 3 show a three forward speeds and one reverse speed box, including a flywheel 1 of an internal combustion engine provided on a motor vehicle. The flywheel acts as the driving member of a centrifugal friction coupling and is provided to this end with pivots 2 about which centrifugal masses 3 are hinged.

The centrifugal masses act on the driven member of the coupling comprising a shallow disc 4 connected with the inlet shaft of the change speed gear box by a spline coupling 4a.

The centrifugal masses 3 of the friction coupling approach, under the action of the centrifugal force and overcoming the action of springs 3a, the inner surface of the shallow disc 4, carrying the latter along in rotation.

The hinge pins 2 for the masses 3 have moreover arranged thereon a one-way clutch comprising pawls 5 provided with friction linings, which are self-locking when the engine is driven by the transmission. Under such conditions the pawls are wedged against the inner surface of the shallow disc 4 and lock the driven and driving members.

The pawls 5 are formed with an extension 6 carrying a pin 7 adapted to be engaged by a notch 8 in the centrifugal masses 3.

The pin 7 and notch 8 draw the pawls 5 away from the inner surface of the driven disc 4 when the masses 3 are drawn by the action of the centrifugal force towards the driven disc. Therefore, during normal operation of the coupling the pawls are removed from the disc 4 to prevent them from giving rise to vibrations and undergoing useless wear.

As mentioned above the inlet shaft of the change speed gear box denoted by 9 is coupled for rotation with the driven disc 4 of the coupling and is axially displaceable relative to the disc 4 by a control operated by the driver; this contol comprising a collar 10 cooperating with a control leverage 11. The shaft 9 is formed with a set of teeth 12 adapted to selectively engage, according to the axial displacement of the shaft, with teeth 13 and 14 formed on a sleeve 15 and on a sleeve 16 both coaxially arranged and free to rotate with respect to the shaft 9. The set of teeth 12 when not coupled with either teeth 13 or 14 are accommodated by a cavity separating the teeth 13 and 14. The sleeve 15 is formed with a set of teeth 17 acting as a first sun wheel of the epicyclic gearing, the sleeve 16 being formed with a set of teeth 18 acting as a further sun wheel for the epicyclic gearing.

The epicyclic gearing comprises a first set of planet wheels 19 meshing with the sun wheel 18, carried by a carrier 20 coaxial with the sleeve 16 carrying the sun wheel 18 and rotatable to the said sleeve.

A further set of planet gears 21 carried by the carrier 20 meshes with the sun wheel 17, planet gears 19 and a toothed rim 22 acting as an outer gear for the epicyclic gearing. The toothed rim 22 is carried by a shallow disc 23 keyed to the outlet shaft 24 of the change speed gear box.

The planet gear carrier 20 is connected for rotation with a frusto-conical ring 25 with respect to which it is axially displaceable against the action of a disc spring 26, the coupling of the planet gear carrier 20 and disc 25 being of the splined type.

A further shallow disc 27 is coupled for rotation with the sleeve 15 through a splined coupling 28 and is pressed by the action of a disc spring 29 against the frusto-conical ring 25 for engagement therewith, the disc 27 being provided with friction linings 27a.

The load of the two disc springs 26, 29 is slightly different, more particularly, the load of spring 26 slightly exceeds the load of spring 29, whereby the conical ring 25 is normally kept in the position shown in FIG. 1.

The conical ring 25 and the likewise frusto-conical outer surface of the shallow disc 27 are faced by friction linings 30, 31 carried by discs 32, 33, respectively, of a substantially L-shaped profile, which are non-rotatively supported in the casing A, and are axially displaceable with respect to the ring 25 and shallow disc 27 against the action of a spring 34. The axial displacement of the disc 32, 33 is effected by hydraulically operated pistons 35, 36.

The friction linings 30, 31 of the discs 32, 33 are adapted to come into contact with the outer surface of the frusto-conical ring 25 and disc 27 in order to brake the latter. Approach of the friction member 30 of the frusto-conical ring 25 locks the planet gear carrier 20, while approach of the friction member 31 to the disc 27 locks the sun wheel 17.

Referring to the above description the operation of the change speed gear box having three forward speeds and one reverse according to this invention is as follows.

The forward gear set or reverse gear, respectively, is selected by axially displacing the shaft 9 by means of the control including the sleeve 10 and leverage 11 in order to cause the set of teeth 12 on the said shaft to mesh with the set of teeth 13 on the sleeve 15 or with the set of teeth 14 on the sleeve 16, to connect the sun wheel 17 or 18 with the driven member 4 of the coupling.

In the former case the reverse gear is selected, while in the latter case the forward gear set is selected. The neutral corresponds to the intermediate position of the shaft 9, when the set of teeth 12 occupies the cavity between teeth 13 and 14.

Assuming the forward gear set have been selected, movement enters the speed box through sun wheel 18 and is transmitted through the planet wheel gear sets 19, 21, respectively, to the rim 22 on the disc 23 and outlet shaft 24.

The various speeds are thrown in by braking the planet gear carrier 20 and shallow disc 27 rotatable with the sun wheel 17. More particularly, on first speed the planet gear carrier 20 is kept stationary by the friction disc 32 which is forced into contact with the frusto-conical ring 25 braking the latter and simultaneously gradually drawing it away from the friction lining 27a on the shallow disc 27 against the action of the disc spring 26.

On first speed the planet gear carrier 20 is therefore locked, the sun wheels 17, 18 being freely rotatable.

In order to throw in the second speed the friction disc 33 is displaced against the action of the spring 34 to bring the friction lining 31 on the said disc into contact with the outer surface of the shallow disc 27 which is axially displaced by the action of the disc 33 against the spring 29 and gradually disengaged from the frusto-conical ring 25. On second speed the sun wheel 17 is locked, the planet gear carrier 20 being released. Under such conditions motion enters the epicyclic gearing through the sun wheel 18 which rotates the planet gears 19, the latter moreover revolving together with the planet gear carrier 20 about the sun wheel 17 on which the planet gears 21 moreover roll, the said planet gears carrying along together with the toothed rim 22 the disc 23 and outlet shaft 24 of the change speed gear box, thereby throwing in the desired transmission ratio.

On third speed which according to this invention is the direct gear, both friction discs 32, 33 are left inoperative in the position shown in FIG. 1. Under such condition by the action of the disc springs 26 and 29 the frusto-conical ring 25 and shallow disc 27 are interengaged, hence fast in rotation. The planet gear carrier 20 and sun wheel 17 therefore rotate at the same speed, the planet gears 11 transmitting motion to the disc 23 without effecting any reduction in speed, so that the inlet and outlet shafts of the change speed gear box rotate at the same angular speed.

In order to throw in the reverse gear the inlet shaft 9 of the change speed gear box is axially displaced to cause the set of teeth 12 to mesh with the set of teeth 13 on the sleeve 15. Motion then enters the change speed gear box through the sun wheel 17. The friction disc 32 brakes the frusto-conical ring 25 and releases it from the shallow disc 27. The planet gear carrier 20 is therefore braked, motion being transmitted through the planet gears 21 to the disc 23 and outlet shaft 24 of the change speed gear box, the planet gears 19 rotating the sun wheel 18 released from the shaft 9 and idling with respect to the planet gear carrier 20.

On first speed and reverse the frusto-conical ring 25 is locked by the action of the friction disc 32, as mentioned above. Since on throwing in the gears the torque transmitted is considerable, the reaction by the frusto-conical ring 25 is increased by pressing the ring 25 against a ring 37 fixed to the casing A of the speed gear and lined with friction material. Approach of the ring 25 to the ring 37 is gradually effected in accordance with the oil pressure of a hydraulic circuit (not shown) for displacing the piston 35 operating the disc 32.

It will be understood that, the principle of the invention being left unaltered, embodiment and constructional details may be widely varied with respect to the non limiting example described and illustrated without departing from the scope of this invention.

What I claim is:

1. A change speed gear box including a stationary housing, a driving shaft external to the housing, a driven shaft extending into the housing, an intermediate axially shiftable shaft rotatably supported in the housing and coaxial with said driving and driven shafts, a centrifugal coupling arranged between said driving and intermediate shaft, a one-way clutch means in said coupling operable to transmit torque from said intermediate shaft to the driving shaft when the former tends to rotate faster than the latter, an epicyclic gear assembly in said housing, the epicyclic gear assembly comprising; a sun wheel freely rotatable relative to the intermediate shaft, means for connecting said sun sheel to said intermediate shaft, at least one further sun wheel freely rotatable about said shafts, at least two sets of planet gears each having its planet gears meshing with one of said sun wheels, at least one planet gear carrier for supporting the planet gears of said sets, the carrier mounted rotatably relative to said intermediate shaft, a ring gear meshing with said planet gears of at least one of said sets of planet gears and drivingly connected to said driven shaft, a first axially shiftable member fast in rotation relative to said planet gear carrier carrying planet gears meshing with the first mentioned sun wheel, a second axially shiftable member fast in rotation relative to one of said second mentioned sun wheels, resilient means urging each of said shiftable members into mutual engagement, by virtue of which both said members rotate at the same speed to effect a direct drive, two axially shiftable brakes supported from the housing, either brake being adapted to face one of said shiftable members, externally operated actuating means for selectively axially displacing said brakes to cause said brakes to engage either of said shiftable members thereby gradually braking and axially shifting the members against the action of said resilient means and simultaneously gradually disengaging said axially shiftable members from reciprocal engagement to effect a gear change drive ratio without passing through a neutral condition.

2. A change speed gear box including; a stationary housing, a driving shaft external to the housing, a driven shaft extending into the housing, an intermediate axially shiftable shaft rotatably supported in the housing and coaxial with said driving and driven shafts, a centrifugal coupling arranged between said driving and intermediate shafts, a one-way clutch means in said coupling operable to transmit torque from said intermediate shaft to the driving shaft when the former tends to rotate faster than the latter, an epicyclic gear assembly in the housing, the epicyclic gear assembly comprising; a first and a second sun wheel both mounted free respectively to said intermediate shaft, means for selectively coupling either of the sun wheels with the intermediate shaft, a first set of planet gears meshing with said first sun wheel, a second set of planet gears meshing with said second sun wheel and with said first set of planet gears, a planet gear carrier mounted rotatably on the intermediate shaft, a ring gear meshing with the second set of planet gears and connected to said driven shaft, an axially shiftable frusto-conical ring fast in rotation with said planet gear carrier, an axially shiftable shallow disc fast in rotation with said first sun wheel and provided with an internal and an external opposing frusto-conical surfaces on its rim portion, said internal frusto-conical surface being complementary to the portion of lesser diameter of said frusto-conical ring, resilient means urging said frusto-conical ring and shallow disc into mutual engagement to effect a direct drive, two axially shiftable frusto-conical brakes supported from the housing, one brake facing said external frusto-conical surface of said shallow disc, the other brake facing the larger diameter portion of said frusto-conical ring, externally operated actuating means for selectively axially displacing said frusto-conical brakes to cause said brakes to engage either said frusto-conical ring or said disc thereby gradually to brake and axially to shift the engaged element against the action of said resilient means and simultaneously gradually to disengage said braked element from the other element to effect a ratio drive without passing through a neutral condition and externally operated actuating means for axially displacing said intermediate shaft from the neutral position into engagement with either sun wheel to effect a forward or reverse drive.

3. In a change speed gear as claimed in claim 2, wherein the resilient means urging said frusto-conical ring and said shallow disc into mutual engagement comprises, a first disc spring disposed between said first sun wheel and said shallow disc and an opposing second disc spring disposed between said frusto-conical ring and said planet gear carrier.

References Cited in the file of this patent
UNITED STATES PATENTS

| | | |
|---|---|---|
| 1,917,775 | Pfluger | July 11, 1933 |
| 2,180,671 | Fleischel | Nov. 21, 1939 |
| 2,243,652 | Reed | May 27, 1941 |
| 2,354,257 | Greenlee | July 25, 1944 |
| 2,807,968 | Forster | Oct. 1, 1957 |
| 2,977,821 | Gorsky | Apr. 4, 1961 |
| 2,990,727 | Miller | July 4, 1961 |

FOREIGN PATENTS

| | | |
|---|---|---|
| 410,252 | Great Britain | May 17, 1934 |
| 846,354 | Great Britain | Aug. 31, 1960 |